Dec. 4, 1923.
H. R. MITCHELL.
AUTOMOBILE THEFT PREVENTER
Filed May 31, 1922.
1,476,166
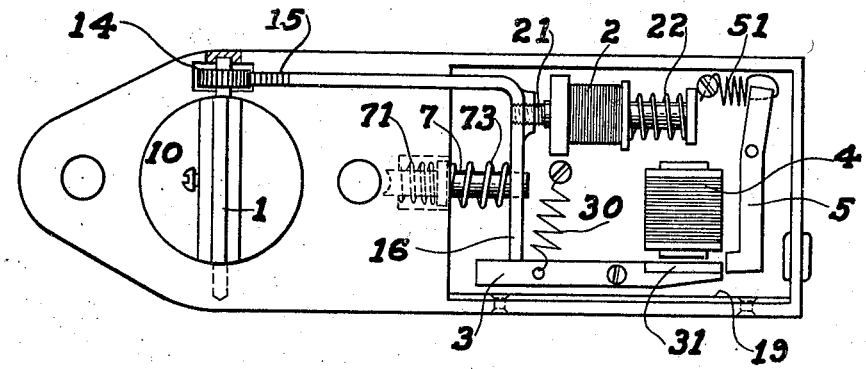
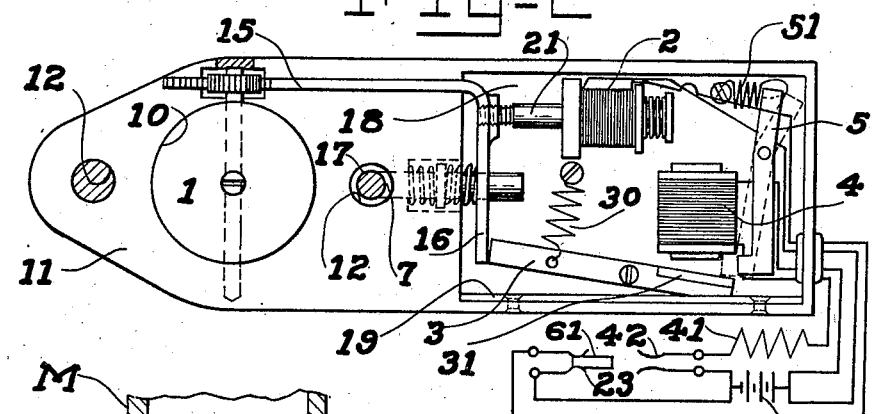
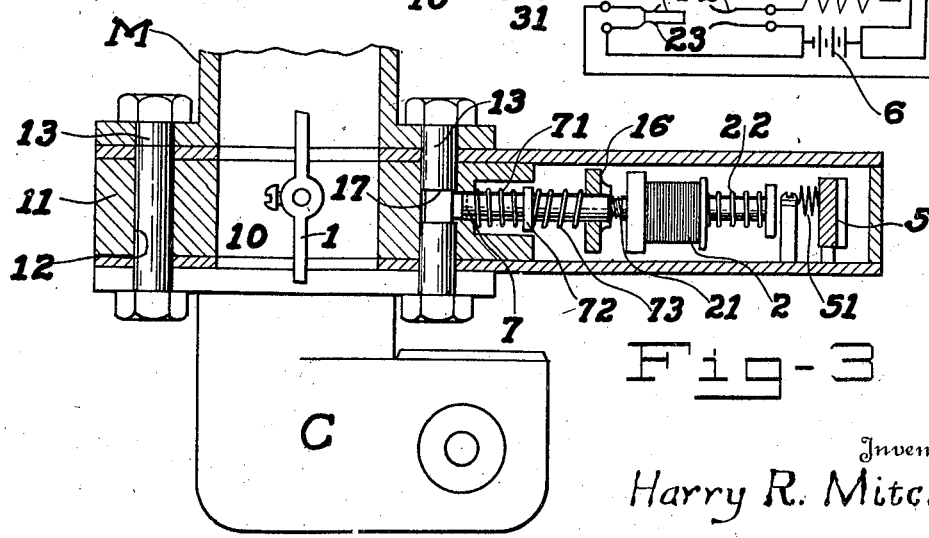
Inventor
Harry R. Mitchell
By N.L. & S.L. Reynolds
Attorneys Patented Dec. 4, 1923.

1,476,166

UNITED STATES PATENT OFFICE.

HARRY R. MITCHELL, OF SEATTLE, WASHINGTON, ASSIGNOR TO MITCHELL PRODUCTS COMPANY, OF SEATTLE, WASHINGTON, A CORPORATION OF WASHINGTON.

AUTOMOBILE THEFT PREVENTER.

Application filed May 31, 1922. Serial No. 564,919.

*To all whom it may concern:*

Be it known that I, HARRY R. MITCHELL, a citizen of the United States of America, and resident of the city of Seattle, in the county of King and State of Washington, have invented certain new and useful Improvements in Automobile Theft Preventers, of which the following is a specification.

My invention relates to that class of mechanisms for preventing theft of an automobile which provide means for controlling the operation of the automobile engine, whereby the engine may not be started until the control mechanism is moved into inoperative position. Such mechanisms commonly employ a lock, and according to my invention the lock itself may be mounted upon the dash of the car, or in some other convenient location, and communicates through suitable electric circuits with mechanism controlling the operation of a butterfly valve interposed between the carburetor and the intake manifold of the engine. It will be apparent that any suitable control means, connected with the gas supply, ignition, or other vital part of the engine, may be employed other than the butterfly valve, but as such control means might be widely varied the butterfly valve shown may be taken as typical of such controls, while not restricting me only to use of such a device.

In mechanisms of this character wherein the actual control member is located at a distance from the lock and is connected thereto by electric wiring, it is generally a simple matter to so manipulate the wiring that the control member may be moved into operative position without disturbing either the lock or the controlling mechanism itself. One of the principal objects of my invention is therefore to provide electrically controlled releasing means for the engine control member which will be operated by a current of a strength less than that normally used and normally available upon an automobile, that is to say, of less than six volts, which means will not be operated by a current of the normal strength.

A further object is to provide means whereby the block which contains the engine control mechanism can be locked in place so that the bolts holding the same in place cannot be removed until the control member itself is moved into inoperative position.

Other objects are to prevent the manipulation of the control mechanism by means of magnets or by drilling into the vital part of the controlling mechanism.

Other objects, and those relating to structural details, may be ascertained from a study of the accompanying drawing and the following specification and claims.

My invention comprises those novel parts and combinations thereof which are shown in the accompanying drawings, described in the specification and particularly defined by the claims terminating the same.

In the accompanying drawings I have shown my invention embodied in a form which is now preferred by me.

Figure 1 is a plan view of a preferred embodiment of my device with the cover removed, parts being shown in the inoperative position.

Figure 2 is a view similar to Figure 1, parts being shown in operative position and the electric circuits connected therewith being shown diagrammatically.

Figure 3 is a vertical section through the device in inoperative position.

Assuming that a valve is to be employed as the engine control member, this will be located between the engine carburetor C and the intake manifold M. I therefore provide a block 11 having an aperture 10 within which is pivoted a butterfly valve 1. Small bores 12 are also provided in the block 11, these being positioned to receive bolts 13 which secure together the flange on the intake manifold, the carburetor and the block 11.

Suitable means are employed for moving the butterfly valve 1 into open or closed position, the means shown herein comprising a pinion 14 on the same shaft as the valve and a rack bar 15 which meshes therewith. Movement of the rack bar 15 may be effected in any suitable manner, as, for instance, by means of its connection to the core 21 of a solenoid 2. A spring 22 acts to maintain the solenoid core in position to maintain the valve 1 open, the core being shown as connected to an extension 16 of the rack bar 15.

In its normal open position the lateral extension 16 is slidable over a latch bar 3 which is urged toward the extension 16 by means of a spring 30. When the solenoid 2 is energized to move the valve 1 into closed position, the extension 16 moves with the rack bar 15 past the end of the latch 3 and the later moves under the influence of spring 30 behind the extension 16, thereby preventing its return.

Preferably the latch 3 is of non-magnetic material, but adjacent one end it is provided with a magnetic portion 31. Adjacent this portion 31 is positioned an electromagnet 4. The magnet 4 is intended to be energized by a current of somewhat less strength than the normal six volt current which is available upon an automobile, thereby to attract the magnetic portion 31 and to release the latch 3. In Figure 2 I have shown a resistance element 41 interposed in the circuit controlling the magnet 4. Release of the latch 3 permits movement of the valve 1 under the influence of spring 22 into open position.

Adjacent the magnet 4, however, and within the field of its magnetic influence, is positioned a magnetic catch 5. A spring 51 normally holds this catch away from the magnet 4 and the latch 3, the spring being sufficiently strong to resist any movement due to the attraction of the magnet 4 when the normal weakened current passes therethrough. However, if an intending thief should energize the magnet 4 by connecting its controlling wiring to opposite terminals of the battery 6, the full strength of the current would pass through the magnet 4 and the catch 5 would immediately be attracted toward the magnet 4 and would be interposed between the magnet and the latch 3 before the latch could be released, thus preventing release of the latch. This is best shown in dotted lines in Figure 2.

It is apparent then that the latch 3 can only be released by a weakened current. By making the latch 3 of non-magnetic material, at least in the end opposite the magnetic portion 31, it will be impossible for an intending thief to attract it by a magnet held outside of the block 11 to cause it to release the extension 16. I further safeguard this against drilling through the side of the block by providing a hardened steel plate 19 which lines this side of the chamber 18 within which the latch and associated parts are placed.

In order to prevent withdrawal of one of the bolts 13 and thus to prevent tampering with the interior of the device, I provide one of these bolts with a reduced portion 17. A pin 7 is slidable within an aperture in the block 11 and its end is normally held from engagement in the groove 17 by means of a spring 71 acting between the bottom of the recess in the block and a collar or flange 72 upon the pin 7. A second spring 73 is interposed between the collar 72 and the extension 16, the latter being apertured to permit passage of the end of the pin 7 therethrough. Upon movement of the rack bar 15 and its extension 16 to close the valve 1 in the manner described above, the pin 7 will be moved forward under the influence of the extension 16 acting through the spring 73. Engagement of the end of the pin 7 in the slot 17 will effectually prevent removal of the bolt 13 so long as the valve 1 remains in closed position.

I have not illustrated any means for controlling the circuits which include the solenoid 2 and the magnet 4 except the switch members 23 and 42 respectively, as the particular form assumed by such controls forms no part of this present invention. A bridge or knife 61 is movable selectively to close the gaps between the members 23 and 42. The member 61 may be controlled by any suitable lock, as by a combination or permutation lock such as is shown in my Patent No. 1,067,936, or any other suitable lock-controlled switch may be employed.

What I claim as my invention is:

1. In combination with an engine control member movable selectively into operative position to prevent starting of the engine, and into inoperative position, electromagnetic means for moving said control member into operative position, a latch for retaining it in operative position, and electromagnetic means for releasing said latch.

2. In combination with an engine control member movable selectively into operative position to prevent starting of the engine, and into inoperative position, electromagnetic means for moving said control member into operative position, a latch for retaining it in operative position, and electromagnetic means, operable by a current of less strength than said first electromagnetic means, for releasing said latch.

3. In combination with an engine control member movable selectively into operative position to prevent starting of the engine, and into inoperative position, a latch, means for moving said control member into operative position to be then held by said latch, an electromagnet operable by a weak current to release said latch, and means magnetically energized when a stronger current is passed through said electromagnet to prevent release of said latch.

4. In combination with an engine control member movable selectively into operative position to prevent starting of the engine, and into inoperative position, a latch, a pair of electromagnets, one for moving said engine control member into operative position to be then engaged and held by said latch, and the other to release said latch, the second electromagnet being operable by a current of less strength than the first, and a catch operable when said second magnet is energized with a current of greater strength than normal to prevent release of said latch.

5. In combination, an engine control member movable selectively into operative position to prevent starting of the engine, and into inoperative position, a latch, means for moving said control member into operative position to be then engaged and held by said latch, an electric circuit including a resistance element and an electromagnet, the electromagnet being operable by a weakened current to release said latch, and means magnetically operable when said resistance is cut out to prevent release of said latch.

6. In combination with an engine control member movable selectively into operable position to prevent starting of the engine, and into inoperative position, a latch having a magnetic portion, means for moving said control member into operative position to be then held by said latch, an electromagnet operable by a weak current upon the magnetic portion of said latch to release it, a catch of magnetic material pivoted adjacent said electromagnet, and a spring holding said catch against the normal attraction of said magnet, and yieldable under greater attraction due to passage therethrough of a stronger current to permit engagement of the catch and latch, thereby preventing release of the latch.

7. In combination with an engine control member movable selectively into operable position to prevent starting of the engine, and into inoperative position, a latch, means for moving said control member into operative position to be then held by said latch, electrically controlled means operable by a weak current to release said latch, and by a stronger current to prevent release thereof.

8. In combination with an apertured block adapted to be interposed between the carburetor and intake manifold of an engine, bolts passing through said block, carburetor, and intake manifold to secure them together, a valve in said block movable to close said aperture, or to open it, mechanism within said block for locking the valve in closed position, and means associated therewith for preventing removal of one of said bolts.

9. In combination with an apertured block adapted to be interposed between the carburetor and intake manifold, bolts passing through said block and portions of the carburetor and intake manifold to secure them together, a valve in said block movable to close or to open said manifold, mechanism within the said block for locking the valve in closed position, a pin movable with and securable by said locking mechanism towards one of said bolts, this bolt having a recess therein to receive the end of said pin.

10. In combination with an engine control member adapted to be moved into operative position to prevent starting of the engine, or into inoperative position, means for moving said member into operative position, a latch of non-magnetic material pivoted between its ends and engageable with said means by one end to retain the control member in operative position, and having a magnetic portion at its opposite end, and an electromagnet energizable to attract said magnetic portion to release the control member.

Signed at Seattle, King County, Washington, this 19th day of May 1922.

HARRY R. MITCHELL.